(12) United States Patent
Chu et al.

(10) Patent No.: US 10,921,862 B2
(45) Date of Patent: Feb. 16, 2021

(54) ELECTRONIC DEVICE

(71) Applicants: Shu-Hsien Chu, Taipei (TW);
Wang-Hung Yeh, Taipei (TW);
Hsin-Chieh Fang, Taipei (TW);
Ching-Shiang Chang, Taipei (TW)

(72) Inventors: Shu-Hsien Chu, Taipei (TW);
Wang-Hung Yeh, Taipei (TW);
Hsin-Chieh Fang, Taipei (TW);
Ching-Shiang Chang, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 99 days.

(21) Appl. No.: 16/419,011

(22) Filed: May 22, 2019

(65) Prior Publication Data

US 2019/0369675 A1 Dec. 5, 2019

Related U.S. Application Data

(60) Provisional application No. 62/675,128, filed on May 22, 2018.

(51) Int. Cl.
*G06F 1/16* (2006.01)
(52) U.S. Cl.
CPC .......... *G06F 1/1677* (2013.01); *G06F 1/1616* (2013.01); *G06F 1/1681* (2013.01); *G06F 1/1684* (2013.01)
(58) Field of Classification Search
CPC .... G06F 1/1616; G06F 1/1633; G06F 1/1675; G06F 1/1677; G06F 1/1681; G06F 1/1684; G06K 9/00006

USPC ................................................ 361/679.27
See application file for complete search history.

(56) References Cited

U.S. PATENT DOCUMENTS

| 6,392,640 | B1* | 5/2002 | Will | H04M 1/2748 |
| | | | | 345/184 |
| 8,289,688 | B2* | 10/2012 | Behar | G06F 1/1616 |
| | | | | 361/679.3 |
| 9,836,025 | B2* | 12/2017 | Ely | G04G 21/08 |
| 2001/0011997 | A1* | 8/2001 | Suzuki | G06F 3/03549 |
| | | | | 345/167 |
| 2003/0115384 | A1* | 6/2003 | Sonehara | G06F 1/169 |
| | | | | 710/10 |
| 2005/0183040 | A1* | 8/2005 | Kondo | G06F 1/1679 |
| | | | | 715/841 |

(Continued)

FOREIGN PATENT DOCUMENTS

| TW | I475438 | 3/2015 |
| TW | I488569 | 6/2015 |

*Primary Examiner* — Anthony Q Edwards
(74) *Attorney, Agent, or Firm* — JCIPRNET

(57) ABSTRACT

An electronic device including a first body, a second body and a rotating switch is provided. The second body is pivoted to the first body. The rotating switch is disposed at a side of the first body, and the rotating switch includes a rotary knob, a rotation sensor and a switch component. The rotary knob is configured to rotate around and slide along a reference axis, and the rotary knob includes a rotating portion and an actuation portion opposite to the rotating portion. The rotation sensor is sleeved on the actuation portion. The switch component is disposed at a side of the actuation portion. On the reference axis, the actuation portion is aligned to the switch component.

14 Claims, 5 Drawing Sheets

(56) References Cited

U.S. PATENT DOCUMENTS

| | | | |
|---|---|---|---|
| 2005/0219216 A1* | 10/2005 | Yoshikawa | G06F 1/169 345/167 |
| 2010/0081478 A1* | 4/2010 | Itoh | H04M 1/0245 455/566 |
| 2010/0158327 A1* | 6/2010 | Kangas | G06K 9/00006 382/124 |
| 2011/0316784 A1* | 12/2011 | Bisutti | G06F 3/0433 345/168 |
| 2012/0182240 A1* | 7/2012 | Urushihata | G06F 1/1692 345/173 |
| 2014/0304947 A1* | 10/2014 | Wang | G06F 1/1681 16/325 |
| 2019/0354661 A1* | 11/2019 | Lu | G06F 21/84 |

* cited by examiner

ELECTRONIC DEVICE

CROSS REFERENCE TO RELATED APPLICATION

This application claims the priority benefit of U.S. provisional application Ser. No. 62/675,128, filed on May 22, 2018. The entirety of the above-mentioned patent application is hereby incorporated by reference herein and made a part of specification.

BACKGROUND

Technical Field

The disclosure relates to an electronic device and more particularly, to an electronic device integrated with a rotating switch.

Description of Related Art

Portable electronic devices, because of being convenient for users to carry and having features of instantly transceiving and processing information, have become indispensable tools for modern people. Furthermore, common portable electronic devices include smart cell phones, tablet computers, smart watches or notebook computers, and among them, the notebook computers are capable of multiplexing and multi-processing and have become preferred by freelance creators, business people or game players.

Currently, most notebook computers have built-in hot keys or hot keys customized by the users, and a specific quick function can be started through a specific key, key sequence or key combination. However, the users may not be able to directly determine the quick function to be started according to the keys, or the users have to memorize the specific key sequence or key combination to start the specific quick function. With regard to the users, it is not intuitive to start the specific quick function through the key sequence or key combination.

SUMMARY

The disclosure provides an electronic device capable of being operated easily and intuitively.

According to an embodiment of the disclosure, an electronic device including a first body, a second body and a rotating switch is provided. The second body is pivoted to the first body. The rotating switch is disposed at a side of the first body, and the rotating switch includes a rotary knob, a rotation sensor and a switch component. The rotary knob is configured to rotate around a reference axis and slide along the reference axis. The rotary knob includes a rotating portion and an actuation portion opposite to the rotating portion. The rotation sensor is sleeved on the actuation portion. The switch component is disposed at a side of the actuation portion. On the reference axis, the actuation portion is aligned to the switch component.

In an embodiment of the disclosure, the rotation sensor includes an encoder or a potentiometer.

In an embodiment of the disclosure, the switch component includes a contact switch or a non-contact switch.

In an embodiment of the disclosure, the electronic device further includes a controller disposed in the first body, and the rotation sensor and the switch component are electrically connected with the controller.

In an embodiment of the disclosure, the actuation portion is located between the switch component and the rotating portion.

In an embodiment of the disclosure, the rotating switch further includes a fingerprint identifier installed at the rotating portion.

In an embodiment of the disclosure, the rotating switch further includes a carrying component installed at the rotating portion. The carrying component includes a front cover and a rear cover opposite to the front cover, wherein a side surface of the front cover is exposed to the rotating portion, and the fingerprint identifier is disposed between the front cover and the rear cover.

In an embodiment of the disclosure, the carrying component further includes a carrying portion located between the front cover and the rear cover, and the fingerprint identifier is disposed between the front cover and the carrying portion. The carrying portion is disposed with a weight block.

In an embodiment of the disclosure, the rotating switch further includes a bearing installed at the rotating portion and configured to connect the carrying component and the rotating portion.

In an embodiment of the disclosure, the fingerprint identifier is electrically connected with the controller.

In an embodiment of the disclosure, the electronic device further includes a hinge cover located between the first body and the second body, and the rotating switch is partially installed in the hinge cover.

In an embodiment of the disclosure, the rotating switch is exposed from the hinge cover, and the actuation portion, the rotation sensor and the switch component are located in the hinge cover.

In an embodiment of the disclosure, the rotary knob further includes a coupling portion located between the rotating portion and the actuation portion, and the coupling portion is located in the hinge cover.

In an embodiment of the disclosure, the hinge cover has a stop portion disposed therein, and the rotation sensor is located between the stop portion and the switch component. The stop portion is located between the rotation sensor and the coupling portion, and the coupling portion abuts against the stop portion through an elastic component. The actuation portion extends from the coupling portion and passes through the stop portion and the rotation sensor to align to the switch component.

To sum up, the electronic device of the disclosure is integrated with the rotating switch, such that a user can operate the rotating switch easily and intuitively and select a quick function through the rotating switch to start the quick function afterwards. Therefore, the operation is convenient.

To make the above features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

Figure 1:
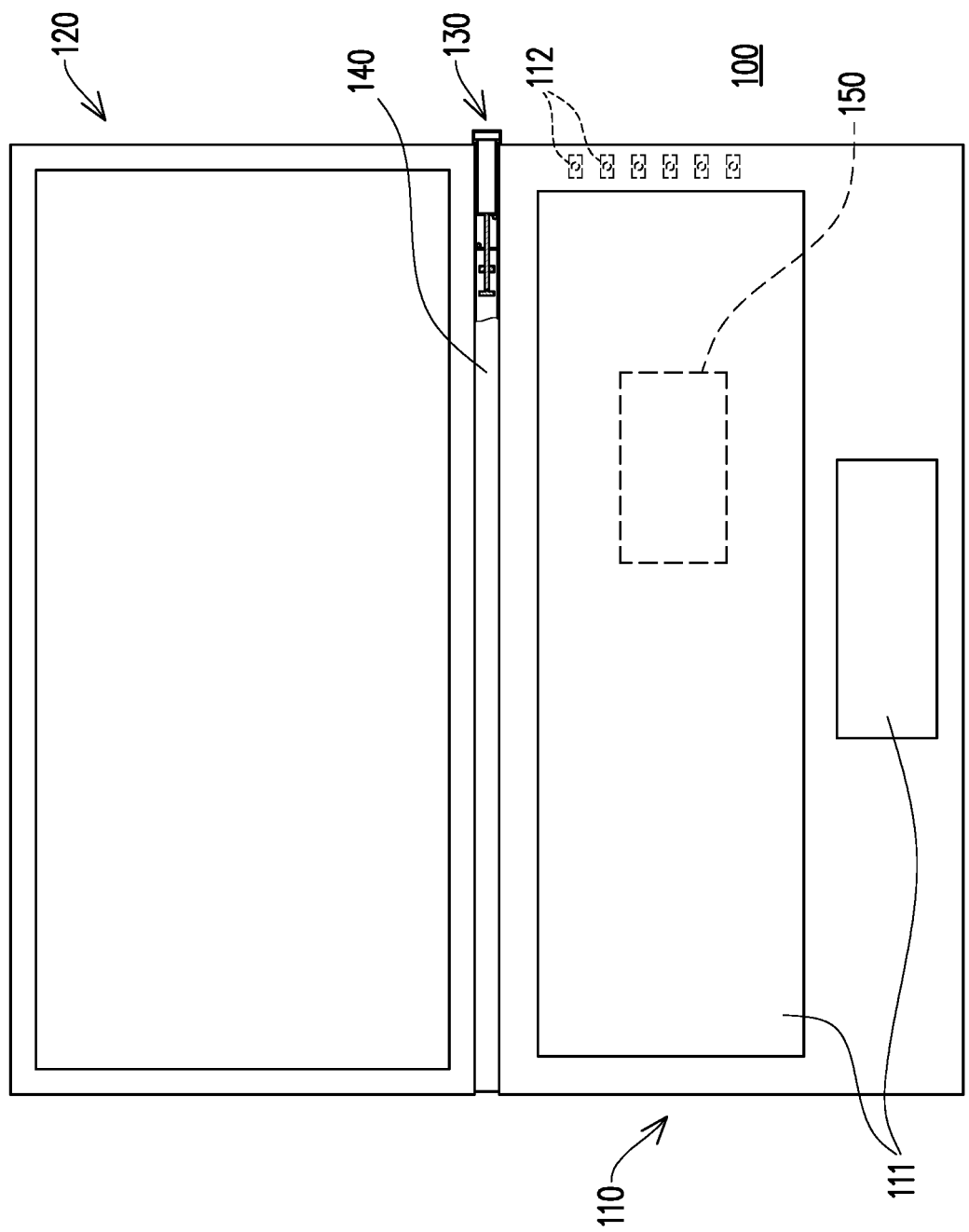
FIG. 1 is a schematic diagram illustrating an electronic device according to an embodiment of the disclosure.
Figure 2:
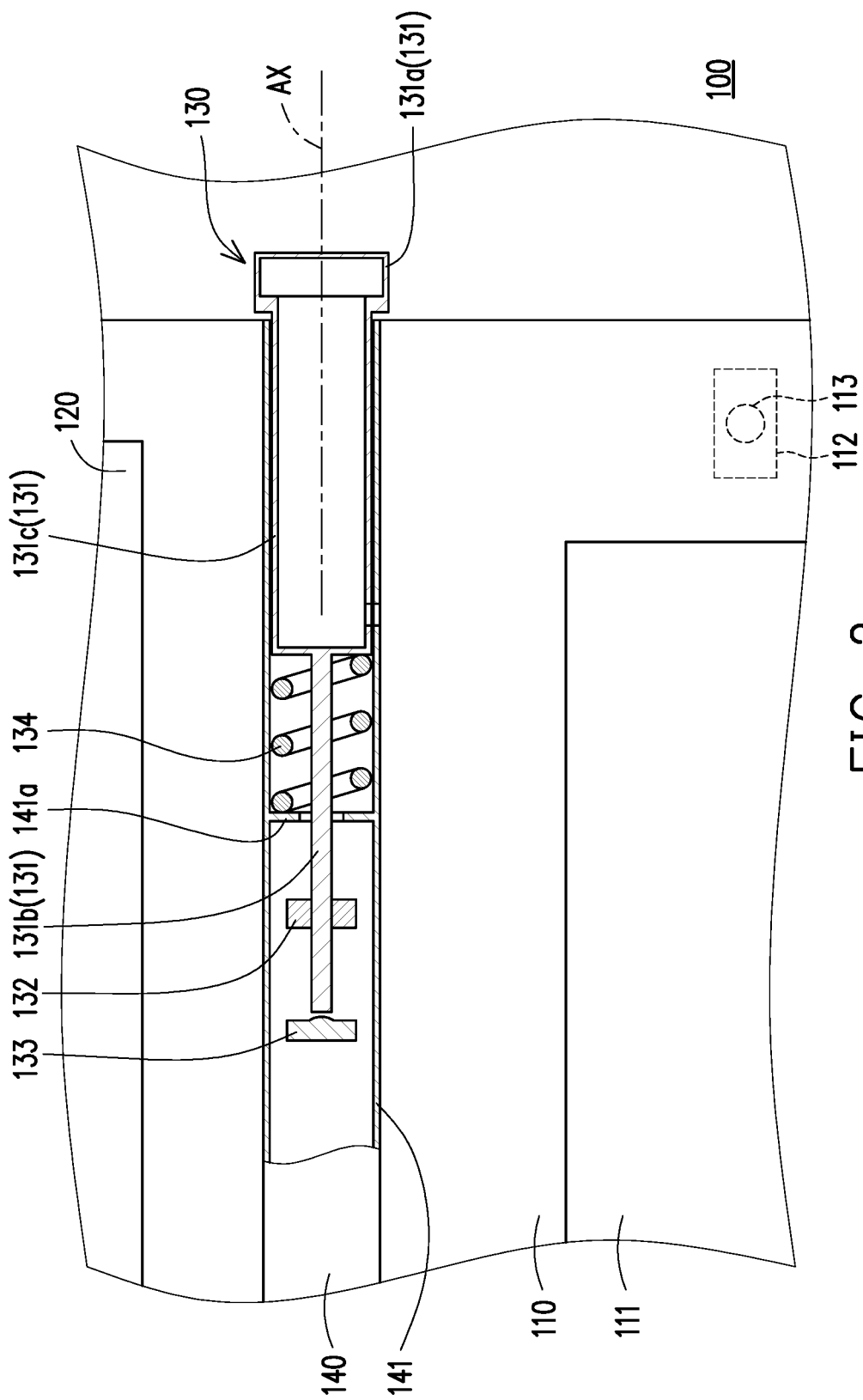
FIG. 2 is an enlarged schematic diagram illustrating where a rotating switch depicted in FIG. 1 is located.
Figure 3:
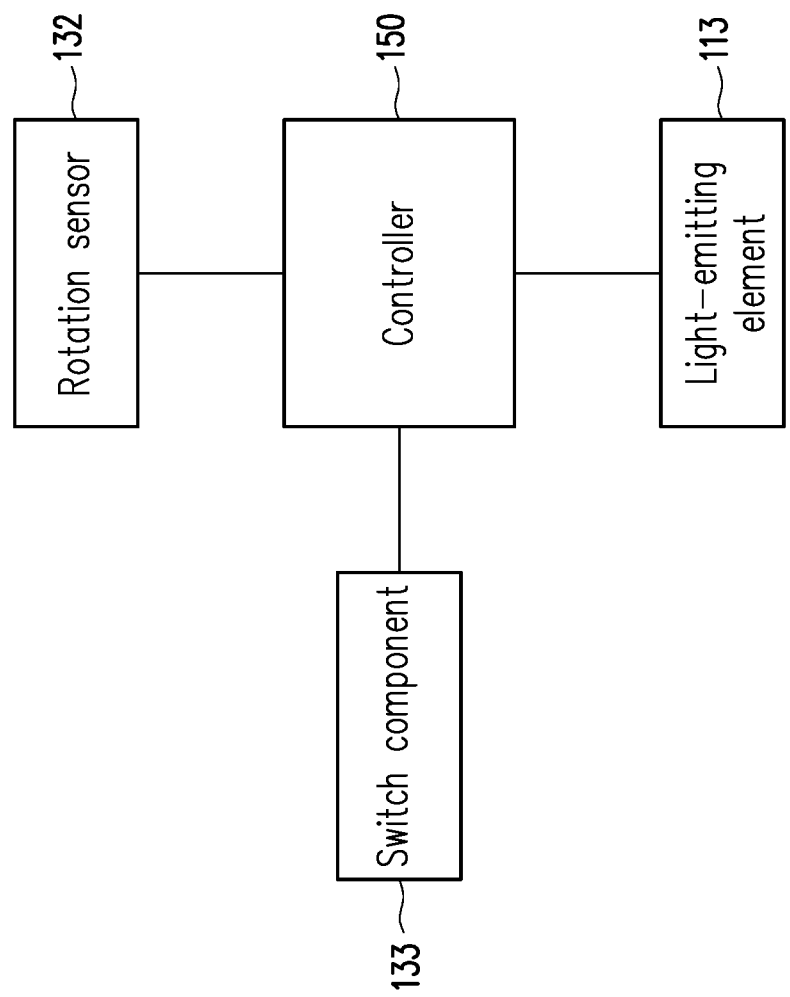
FIG. 3 is a schematic circuit diagram illustrating the electronic device according to an embodiment of the disclosure.

FIG. 1 is a schematic diagram illustrating an electronic device according to an embodiment of the disclosure. FIG. 2 is an enlarged schematic diagram illustrating where a rotating switch depicted in FIG. 1 is located. FIG. 3 is a schematic circuit diagram illustrating the electronic device according to an embodiment of the disclosure. It should be specially mentioned that in order to clearly exhibit the internal structure configuration of a rotating switch 130, it is illustrated in a partial cross-sectional manner in FIG. 1 and FIG. 2. First, referring to FIG. 1 and FIG. 2, in the present embodiment, an electronic device 100 may be, for example, a combination of a notebook computer or a tablet computer and a docking station. The electronic device 100 includes a first body 110, a second body 120 and a rotating switch 130. The first body 110 may have an input operation area 111 (e.g., a keyboard and a touch pad), and the second body 120 may be a display.

The second body 120 is pivoted to the first body 110 though a hinge structure 140, wherein the rotating switch 130 is disposed between the first body 110 and the second body 120 and may be integrated with the hinge structure 140, but the disclosure is not limited thereto. In other implementation aspects, the rotating switch 130 may be disposed between the first body 110 and the second body 120, without being integrated with the hinge structure 140. Alternatively, the rotating switch 130 may be disposed at the other side or on the other surface of the first body 110, instead of being located between the first body 110 and the second body 120. In other words, the position of the rotating switch 130 may be adjusted depending on an actual design requirement.

Referring to FIG. 2, in the present embodiment, the rotating switch 130 includes a rotary knob 131, a rotation sensor 132 and a switch component 133, wherein the rotary knob 131 is configured to rotate around a reference axis AX and slide along the reference axis AX, and the rotary knob 131 includes a rotating portion 131a and an actuation portion 131b opposite to the rotating portion 131a. Specifically, the rotation sensor 132 is sleeved on the actuation portion 131b, wherein the rotation sensor 132 may use an encoder or a potentiometer, and the encoder may be a rotary encoder, for example, an incremental encoder, or an absolute encoder. When the rotary knob 131 rotates around the reference axis AX, the rotation sensor 132 may be used to sense a rotation amount of the rotary knob 131. On the other hand, the switch component 133 is disposed at a side of the actuation portion 131b, and the actuation portion 131b is located between the rotating portion 131a and the switch component 133. On the reference axis AX, the actuation portion 131b is aligned to the switch component 133, and the switch component 133 may be a contact switch (e.g., a micro switch) or a non-contact switch (e.g., a proximity switch). Taking the contact switch as an example, when the rotary knob 131 slides along the reference axis AX, the switch component 133 is triggered if the actuation portion 131b abuts against the switch component 133. Taking the non-contact switch as an example, when the rotary knob 131 slides along the reference axis AX, the switch component 133 is triggered if a distance between the actuation portion 131b and the switch component 133 is smaller than or equal to a preset value.

Furthermore, the hinge structure 140 is one of the components of the electronic device 100, wherein the hinge structure 140 includes a hinge cover 141, and the hinge cover 141 is located between the first body 110 and the second body 120. The rotating switch 130 is partially installed in the hinge cover 141, wherein the rotating portion 131a is exposed from the hinge cover 141 for a user to operate conveniently, and the actuation portion 131b, the rotation sensor 132 and the switch component 133 are located in the hinge cover 141. The rotation sensor 132 and the switch component 133 are positioned in the hinge cover 141 and do not move and rotate relative to the hinge cover 141. The actuation portion 131b may be a pillar structure, wherein the actuation portion 131b passes through the rotation sensor 132 and extends toward the switch component 133.

In the present embodiment, the rotary knob 131 further includes a coupling portion 131c, wherein the coupling portion 131c is located between the rotating portion 131a and the actuation portion 131b and located in the hinge cover 141. Furthermore, the actuation portion 131b extends from the coupling portion 131c and extends toward the rotation sensor 132 and the switch component 133. On the reference axis AX, the rotation sensor 132 is located between the coupling portion 131c and the switch component 133. On the other hand, a stop portion 141a is disposed in the hinge cover 141, and the rotation sensor 132 is located between the stop portion 141a and the switch component 133. The stop portion 141a is located between the rotation sensor 132 and the coupling portion 131c, wherein the actuation portion 131b extends from the coupling portion 131c and passes through the stop portion 141a and the rotation sensor 132 to align to the switch component 133.

Specifically, a distance is maintained between the coupling portion 131c and the stop portion 141a, and this distance may be changed along with the sliding of the rotary knob 131. The coupling portion 131c abuts against the stop portion 141a through an elastic component 134. Namely, the elastic component 134 is disposed between the coupling portion 131c and the stop portion 141a. The elastic component 134 may use a compression spring, and when the rotary knob 131 slides along the reference axis AX, the elastic component 134 is compressed if the distance between the coupling portion 131c and the stop portion 141a is reduced. Once a force driving the actuation portion 131b to slide toward the switch component 133 is removed, an elastic restoring force of the elastic component 134 drives the rotary knob 131 to slide in a direction far away from the switch component 133, such that the distance between the coupling portion 131c and the stop portion 141a is restored to an initial distance.

Referring to FIG. 1 to FIG. 3, in the present embodiment, the electronic device 100 further includes a controller 150 disposed in the first body 110, and the rotation sensor 132 and the switch component 133 are electrically connected with the controller 150. For example, the controller 150 may be a processor chip, or a central processing unit (CPU), or any other general or specific purpose programmable microprocessor, a digital signal processor (DSP), a programmable controller, an application specific integrated circuit (ASIC), a programmable logic device (PLD) or other similar processing circuits, or a combination of these devices. Meanwhile, in the present embodiment, the controller 150 may further include a storage device or an external storage device. The storage device may be, for example, a dynamic random access memory (DRAM), a flash memory or a non-volatile random access memory (NVRAM).

On the other hand, the first body 110 has a plurality of light transmitting pattern areas 112 disposed therein, and the light transmitting areas 112 and the input operation area 111 may be located at the same side of the first body 110. A plurality of light-emitting elements 113 are disposed in the first body 110, wherein the light-emitting elements 113 and the light transmitting pattern areas 112 are disposed in a one-to-one manner, and the light-emitting elements 113 are electrically connected with the controller 150. When the rotary knob 131 rotates around the reference axis AX, the rotation sensor 132 senses the rotation amount of the rotary knob 131 and transmits a signal to the controller 150, and the controller 150 controls an illumination timing of the light-emitting elements 113 based on the rotation amount of the rotary knob 131.

Specifically, each of the light transmitting pattern areas 112 corresponds to a quick function. When the controller 150 controls any one of the light-emitting elements 113 to emit light, the light emitted from the light-emitting element 113 passes the corresponding light transmitting pattern area 112 and is projected to the outside, thereby prompting a currently selected quick function to the user. In this circumstance, if the user presses the rotary knob 131 to drive the actuation portion 131b to trigger the switch component 133, the controller 150 starts the quick function corresponding to the selected light transmitting pattern area 112. In other implementation aspects, the rotating switch 130 may be configured to switch a plurality of quick functions from a menu shown on the second body 120 and start any one of the quick functions which is selected.

In brief, not only the electronic device 100 of the present embodiment is convenient for the user's operation, but also an operation method thereof is easy and intuitive. On the other hand, the rotating switch 130 is integrated with the hinge structure 140 for the electronic device 100 to keep a simple appearance.

Figure 4:
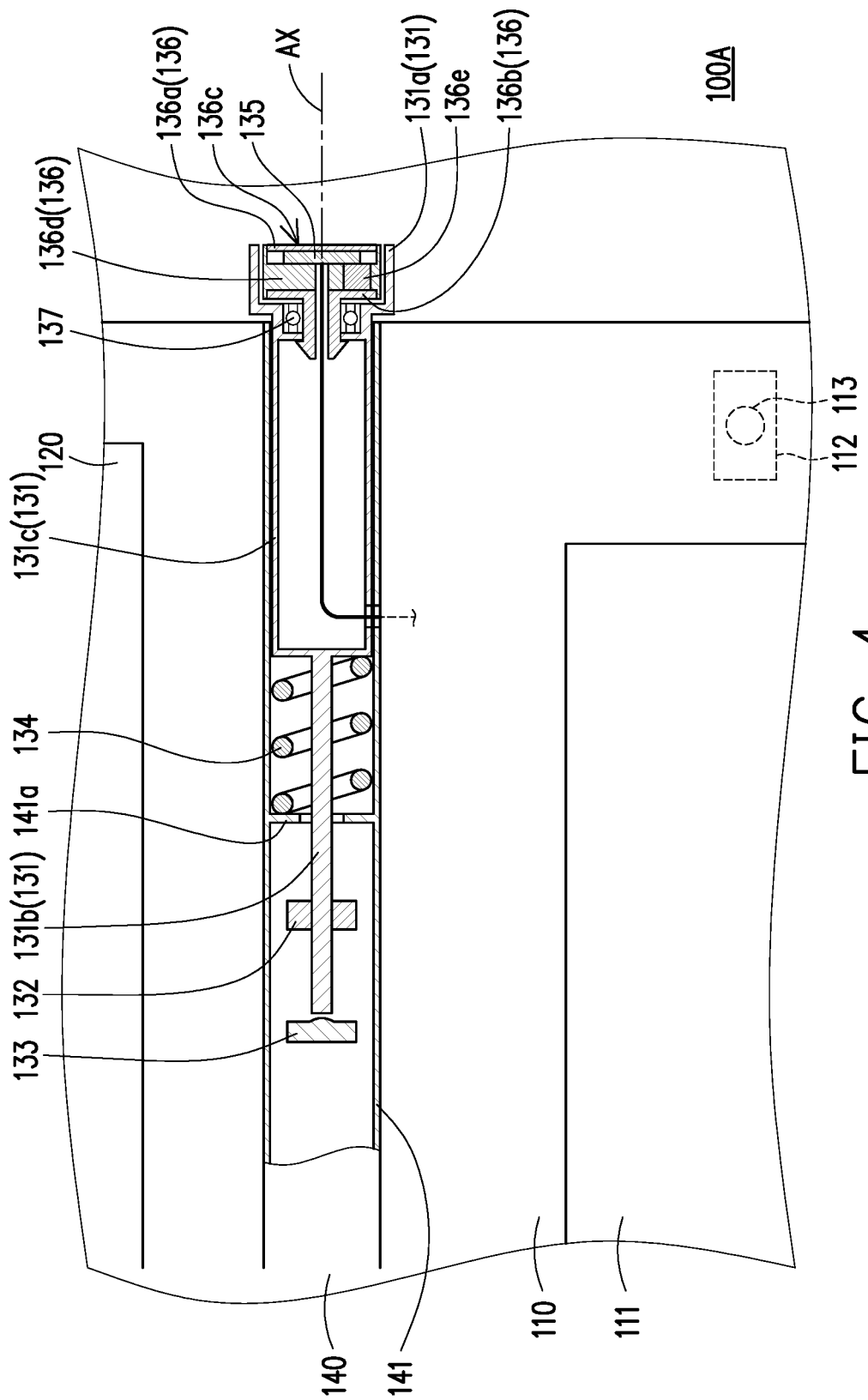
FIG. 4 is an enlarged schematic diagram illustrating where a rotating switch of an electronic device is located according to another embodiment of the disclosure.
Figure 5:
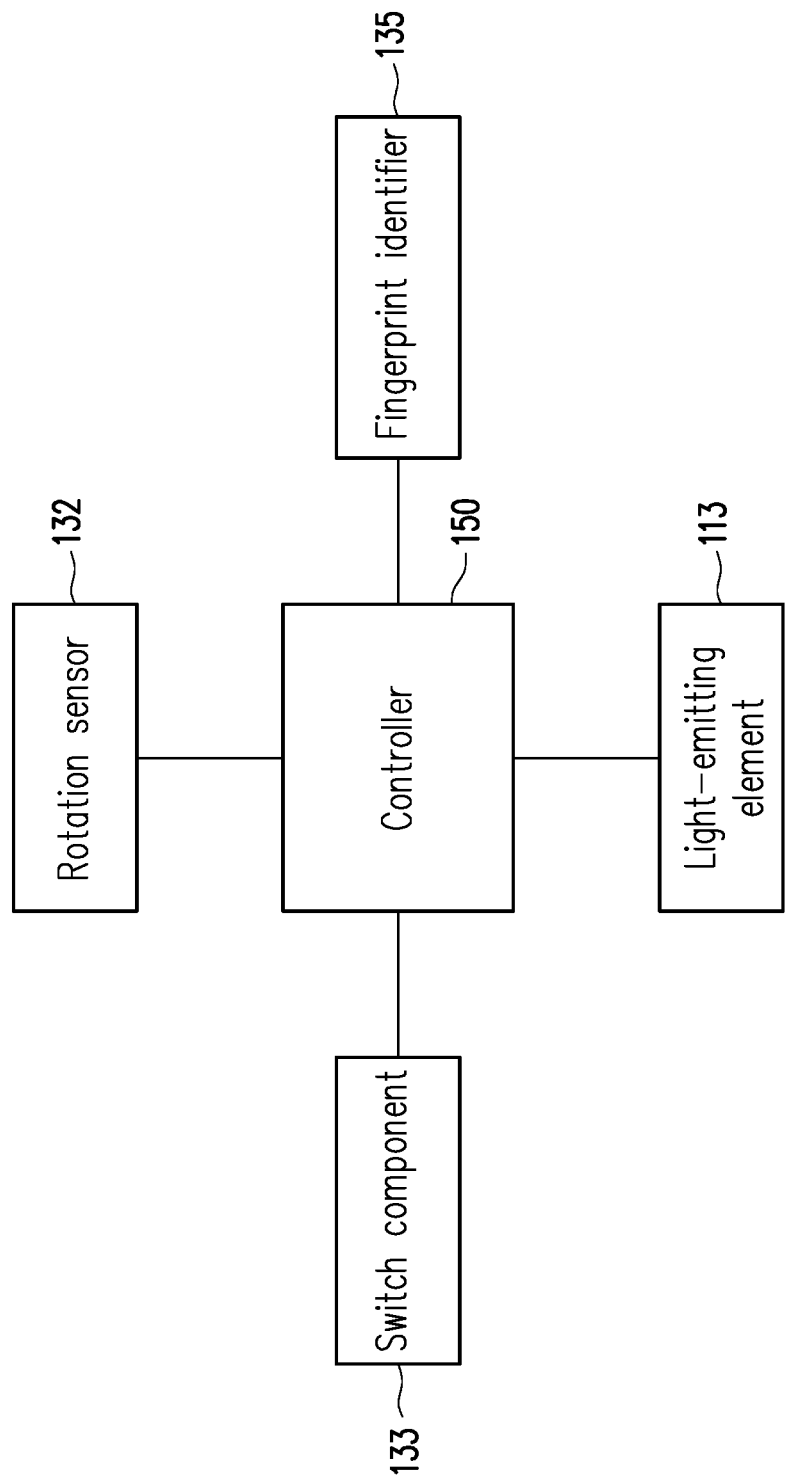
FIG. 5 is a schematic circuit diagram illustrating the electronic device according to another embodiment of the disclosure.

FIG. 4 is an enlarged schematic diagram illustrating where a rotating switch of an electronic device is located according to another embodiment of the disclosure. FIG. 5 is a schematic circuit diagram illustrating the electronic device according to another embodiment of the disclosure. It should be specially mentioned that in order to clearly exhibit the internal structure configuration of a rotating switch 130a, it is illustrated in a partial cross-sectional manner in FIG. 4. Referring to FIG. 4 and FIG. 5, a design principle of the rotating switch 130a used by an electronic device 100A of the present embodiment is substantially the same as or similar to that of the rotating switch 130 of the previous embodiment, and a difference therebetween lies in that: in the present embodiment, the rotating switch 130a is integrated with a biometric characteristic identification mechanism, and before the controller 150 starts the quick function, the authentication of the biometric characteristic identification mechanism must be passed, such that the security for information maintenance or privacy maintenance may be improved.

Furthermore, the rotating portion 131a and the coupling portion 131c of the rotating switch 130a may form a hollow structure communicating with each other, wherein the rotating switch 130a further includes a fingerprint identifier 135, and the fingerprint identifier 135 is installed at the rotating portion 131a and is electrically connected with the controller 150. The fingerprint identifier 135 may use capacitive fingerprint identification technique, ultrasonic fingerprint identification technique, or optical fingerprint identification technique. When the user selects and starts the quick function, the user's fingertip has to face to the fingerprint identifier 135, such that the user's fingerprint information is obtained via the fingerprint identifier 135. Then, the user's fingerprint information is transmitted to the controller 150, and whether the user's fingerprint information matches fingerprint information stored in a memory may be determined via the controller 150. If it is matched in the determination, the quick function is officially started.

In the present embodiment, the rotating switch 130 further includes a carrying component 136 installed at the rotating portion 131a, and the fingerprint identifier 135 is installed in the carrying component 136. Specifically, the carrying component 136 includes a front cover 136a and a rear cover 136b opposite to the front cover 136a, wherein the rotating portion 131a has an opening communicating with the outside, and the front cover 136a is installed at the opening, such that a side surface 136c of the front cover 136a is exposed to the rotating portion 131a. On the other hand, the rear cover 136b is installed inside the rotating portion 131a, and the fingerprint identifier 135 is disposed between the front cover 136a and the rear cover 136b. For example, the user may use the fingertip to touch the side surface 136c of the front cover 136a to align to the fingerprint identifier 135. In correspondence to the identification technique used by the fingerprint identifier 135, the front cover 136a may be light transmissive or opaque.

Referring to FIG. 4, the rotating switch 130a further includes a bearing 137 installed at the rotating portion 131a and configured to connect the rotating portion 131a and the carrying component 136. For example, the bearing 137 includes an outer ring and an inner ring opposite to each other, wherein the outer ring of the bearing 137 abuts against an inner wall of the rotating portion 131a, and the inner ring of the bearing 137 is sleeved on an outer wall (for example, the outer wall sleeved on the rear cover 136b) of the carrying component 136. In the present embodiment, the carrying component 136 further includes a carrying portion 136d, wherein the carrying portion 136d is located between the front cover 136a and the rear cover 136b, and the fingerprint identifier 135 is disposed between the front cover 136a and the carrying portion 136d. For example, the fingerprint identifier 135 may be fixed to the front cover 136a or the carrying portion 136d, wherein the rear cover 136b and the carrying portion 136d are respectively disposed with through holes for wires of the fingerprint identifier 135 to pass through. On the other hand, the carrying portion 136d is disposed with a weight block 136e. During the rotation process of the rotating portion 131a, the carrying component 136 may not rotate along with the rotating portion 131a based on the disposition of the weight block 136e, but the rotating portion 131a may still rotate relative to the carrying component 136 through the bearing 137. Namely, during the rotation process of the rotating portion 131a, the carrying component 136 and the fingerprint identifier 135 therein may keep still, but the rotating portion 131a may smoothly rotate relative to the carrying component 136 through the bearing 137.

In light of the foregoing, the electronic device of the disclosure is integrated with the rotating switch, such that the user can operate the rotating switch easily and intuitively and select the quick function through the rotating switch to start the quick function afterwards. Therefore, the operation is convenient. On the other hand, the rotating switch can be integrated with the hinge structure for the electronic device to keep a simple appearance. In one of the embodiments, the rotating switch is integrated with the biometric characteristic identification mechanism, and the authentication of the biometric characteristic identification mechanism must be passed before the quick function is started, such that the security for the information maintenance or the privacy maintenance can be improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic apparatus, comprising:
    a first body;
    a second body, pivoted to the first body; and
    a rotating switch, disposed at a side of the first body, wherein the rotating switch comprises:
        a rotary knob, configured to rotate around a reference axis and slide along the reference axis, and the rotary knob comprising a rotating portion and an actuation portion opposite to the rotating portion;
        a rotation sensor, sleeved on the actuation portion; and
        a switch component, disposed at a side of the actuation portion, and the actuation portion being aligned to the switch component on the reference axis.

2. The electronic device according to claim 1, wherein the rotation sensor comprises an encoder or a potentiometer.

3. The electronic device according to claim 1, wherein the switch component comprises a contact switch or a non-contact switch.

4. The electronic device according to claim 1, further comprising:
    a controller, disposed in the first body, and the rotation sensor and the switch component being electrically connected with the controller.

5. The electronic device according to claim 1, wherein the actuation portion is located between the switch component and the rotating portion.

6. The electronic device according to claim 1, wherein the rotating switch further comprises a fingerprint identifier installed at the rotating portion.

7. The electronic device according to claim 6, wherein the rotating switch further comprises a carrying component installed at the rotating portion, and the carrying component comprises a front cover and a rear cover opposite to the front cover, wherein a side surface of the front cover is exposed to the rotating portion, and the fingerprint identifier is disposed between the front cover and the rear cover.

8. The electronic device according to claim 7, wherein the carrying component further comprises a carrying portion located between the front cover and the rear cover, the fingerprint identifier is disposed between the front cover and the carrying portion, and the carrying portion is disposed with a weight block.

9. The electronic device according to claim 7, wherein the rotating switch further comprises a bearing installed at the rotating portion and configured to connect the carrying component and the rotating portion.

10. The electronic device according to claim 6, further comprising:
    a controller, disposed in the first body, and the rotation sensor, the switch component and the fingerprint identifier being electrically connected with the controller.

11. The electronic device according to claim 1, further comprising a hinge cover located between the first body and the second body, and the rotating switch being partially installed in the hinge cover.

12. The electronic device according to claim 11, wherein the rotating switch is exposed from the hinge cover, and the actuation portion, the rotation sensor and the switch component are located in the hinge cover.

13. The electronic device according to claim 12, wherein the rotary knob further comprises a coupling portion located between the rotating portion and the actuation portion, and the coupling portion is located in the hinge cover.

14. The electronic device according to claim 13, wherein the hinge cover has a stop portion disposed therein, the rotation sensor is located between the stop portion and the switch component, the stop portion is located between the rotation sensor and the coupling portion, and the coupling portion abuts against the stop portion through an elastic component, wherein the actuation portion extends from the coupling portion and passes through the stop portion and the rotation sensor to align to the switch component.

* * * * *